(12) United States Patent
Foote

(10) Patent No.: US 9,204,031 B2
(45) Date of Patent: Dec. 1, 2015

(54) SYSTEM AND METHOD FOR PERFORMING AUTO-FOCUS PROCESS

(71) Applicant: STMICROELECTRONICS (RESEARCH & DEVELOPMENT) LIMITED, Marlow Buckinghamshire (GB)

(72) Inventor: William Foote, Surrey (GB)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 136 days.

(21) Appl. No.: 13/903,627

(22) Filed: May 28, 2013

(65) Prior Publication Data

US 2013/0342750 A1 Dec. 26, 2013

(30) Foreign Application Priority Data

May 30, 2012 (GB) .................................. 1209610.3

(51) Int. Cl.
*H04N 5/232* (2006.01)
*H04N 5/353* (2011.01)

(52) U.S. Cl.
CPC ......... *H04N 5/23212* (2013.01); *H04N 5/3532* (2013.01)

(58) Field of Classification Search
CPC .. H04N 5/23212; H04N 5/374; H04N 5/3532
USPC .......................... 348/345, 350, 353, 354–356
See application file for complete search history.

(56) References Cited

U.S. PATENT DOCUMENTS

| | | | |
|---|---|---|---|
| 5,477,271 A * | 12/1995 | Park | 348/356 |
| 7,611,060 B2 * | 11/2009 | Wang et al. | 235/462.24 |
| 8,300,142 B2 * | 10/2012 | Konno | 348/372 |
| 2006/0202038 A1 * | 9/2006 | Wang et al. | 235/462.24 |
| 2011/0019067 A1 * | 1/2011 | Matsumoto et al. | 348/346 |
| 2011/0050945 A1 * | 3/2011 | Konno | 348/222.1 |
| 2011/0058096 A1 | 3/2011 | Chou et al. | |
| 2011/0069190 A1 | 3/2011 | Chou et al. | |
| 2012/0019676 A1 | 1/2012 | Foote | |

FOREIGN PATENT DOCUMENTS

| | | |
|---|---|---|
| GB | 1012459 | 12/1965 |
| GB | 2482290 | 2/2012 |

* cited by examiner

*Primary Examiner* — Ahmed A Berhan
(74) *Attorney, Agent, or Firm* — Allen, Dyer, Doppelt, Milbrath & Gilchrist, P.A.

(57) ABSTRACT

The method includes changing a focal length of a camera device while capturing one or more frames of sensor data from a sensor array of the camera device by sequentially reading signals from different areas of the sensor array, such that different sections of each of the one or more frames corresponds to sensor data captured at different focal lengths of the camera device. The method further includes deriving focus statistics from the one or more captured frames, each focus statistic providing a measure of an extent to which a section of a frame to which the focus statistic relates is in focus at a given focal length; identifying from the focus statistics an optimal focal length at which an optimally focused image can be captured; and adapting the focal length of the camera device in accordance with the optimal focal length.

26 Claims, 9 Drawing Sheets

SYSTEM AND METHOD FOR PERFORMING AUTO-FOCUS PROCESS

FIELD OF THE INVENTION

The invention relates to methods and systems for performing an auto-focus process, and, in particular, for performing an auto-focus procedure in a camera device.

BACKGROUND OF THE INVENTION

Many consumer electronic devices, such as smart-phones, lap-top computers, tablet computers and so on include a camera function for capturing still images and video. The camera function is typically provided by an image capturing module installed in the device.

These image capturing modules often include an auto-focus function. The auto-focus function enables a process to be performed whereby the focal length of the image capturing module is adjusted without direct input from the user so that a scene that a user is trying to capture an image of is in focus. The auto-focus process is typically performed by stepping through a series of focal positions (i.e. focal lengths), frame by frame, and analyzing each frame to determine a "sharpness" statistic (i.e. a focus statistic) captured by the image capturing module in each frame. A comparison of these statistics enables an optimal focal length to be identified and the focal length of the image capturing module to be adjusted accordingly.

Using this technique at least one frame is captured at several focal positions. It can often take many frames to determine the optimal focal length which results in a poor auto-focus convergence time (i.e. the time taken for the image capturing module to identify and move to the optimal focal length). A user may find this inconvenient particularly when attempting to capture an image of a scene that is changing rapidly.

Accordingly, it is desirable to reduce the auto-focus convergence time.

SUMMARY OF THE INVENTION

In accordance with a first aspect of the present invention there is provided a method of performing an auto-focusing process. The method comprises changing a focal length of a camera device while capturing one or more frames of sensor data from a sensor array of the camera device by sequentially reading signals from different areas of the sensor array, such that different sections of each of the one or more frames corresponds to sensor data captured at different focal lengths of the camera device. The method further comprises deriving a plurality of focus statistics from the one or more captured frames, each focus statistic providing a measure of an extent to which a section of a frame to which the focus statistic relates is in focus at a given focal length; identifying from the plurality of focus statistics an optimal focal length at which an optimally focused image can be captured; and adapting the focal length of the camera device in accordance with the optimal focal length.

In accordance with this aspect, one or more frames are captured as the focal length of the camera device is changing. Furthermore, the one or more frames are captured such that different sections of each of the one or more frames correspond to different focal lengths of the camera device. This means that more than one focus statistic for more than one focal point position can be derived from one frame. This reduces the auto-focus convergence time because fewer frames need to be captured to identify the optimal focal length. Alternatively or additionally, slower (and thus less expensive), lens actuator units can be used to perform the auto-focus procedure without reducing the auto-focus convergence time.

Furthermore, this method can be performed in conjunction with a so-called "rolling shutter" technique whereby sensor data is read sequentially from different regions of the sensor array to reduce the amount of memory required to store sensor data prior to processing. Many camera devices employ a rolling shutter technique to capture image data. Therefore implementing an auto-focus process in accordance with this aspect will have minimal alteration to existing camera device design.

Optionally identifying the optimal focal length comprises identifying from the plurality of focus statistics an optimal focus statistic, the optimal focus statistic indicating that a section of a frame to which it relates is most in focus compared to other sections of the one or more captured frames, and identifying a focal length associated with the optimal focus statistic as the optimal focal length.

Optionally identifying the optimal focus statistic comprises identifying which of the plurality of focus statistics has a highest value.

Optionally the step of deriving the plurality of focus statistics comprises deriving each focus statistic from one or more regions of interest from a corresponding section of the one or more frames.

Optionally, wherein the camera device captures a plurality of frames of sensor data, the method includes generating a plurality of focus data sets, each focus data set comprising the focus statistics relating to one of the plurality of regions of interest and providing a through focus curve relating to that region of interest, each of the through focus curves indicating an extent to which the corresponding region of interest is in focus as the focal length of the camera device changes.

In accordance with examples including this step, a frame comprising regions of interest with multiple optimal focal point positions can be accommodated.

Optionally identifying the optimal focal length comprises: determining an average value for the focus statistics in each focus data set; identifying which data set has the highest average focus statistic value; and identifying the optimal focal length from a focal length associated with a highest value focus statistic from the focus data set determined to have the highest average focus statistic value.

Optionally identifying the optimal focal length comprises: normalizing the plurality of focus data sets with respect to each other, and identifying the optimal focal length from a focal length associated with a focus statistic from the normalized focus data sets with a highest normalized value.

Optionally identifying the optimal focal length comprises: identifying a plurality of peaks from each of the through focus curves, determining a plurality of focal lengths, each focal point length corresponding to one of the plurality of peaks, determining an average focal length from the plurality of focal lengths corresponding to the plurality of peaks, and identifying the optimal focal length as corresponding to the determined average focal length.

In accordance with a second aspect there is provided an auto-focus system for a camera device. The camera device comprises a lens stack arranged to direct light onto a sensor array and a processor arranged to control the lens stack to change a focal length of the camera device while one or more frames of sensor data are captured from the sensor array by sequentially reading signals from different areas of the sensor array, such that different sections of each of the one or more frames corresponds to sensor data captured at different focal lengths. The processor is arranged to derive a plurality of focus statistics from the one or more captured frames, each focus statistic providing a measure of an extent to which a section of a frame to which the focus statistic relates is in focus at a given focal length, identify from the plurality of focus statistics an optimal focal length at which an optimally focused image can be captured; and control the lens stack in accordance with the optimal focal length thereby focusing the camera device.

BRIEF DESCRIPTION OF THE DRAWINGS

Embodiments of the present invention will now be described by way of example only with reference to the accompanying drawings where like parts are provided with corresponding reference numerals and in which.

DETAILED DESCRIPTION OF THE PREFERRED EMBODIMENTS

Conventional Auto-Focusing Image Capturing Module

Figure 1:
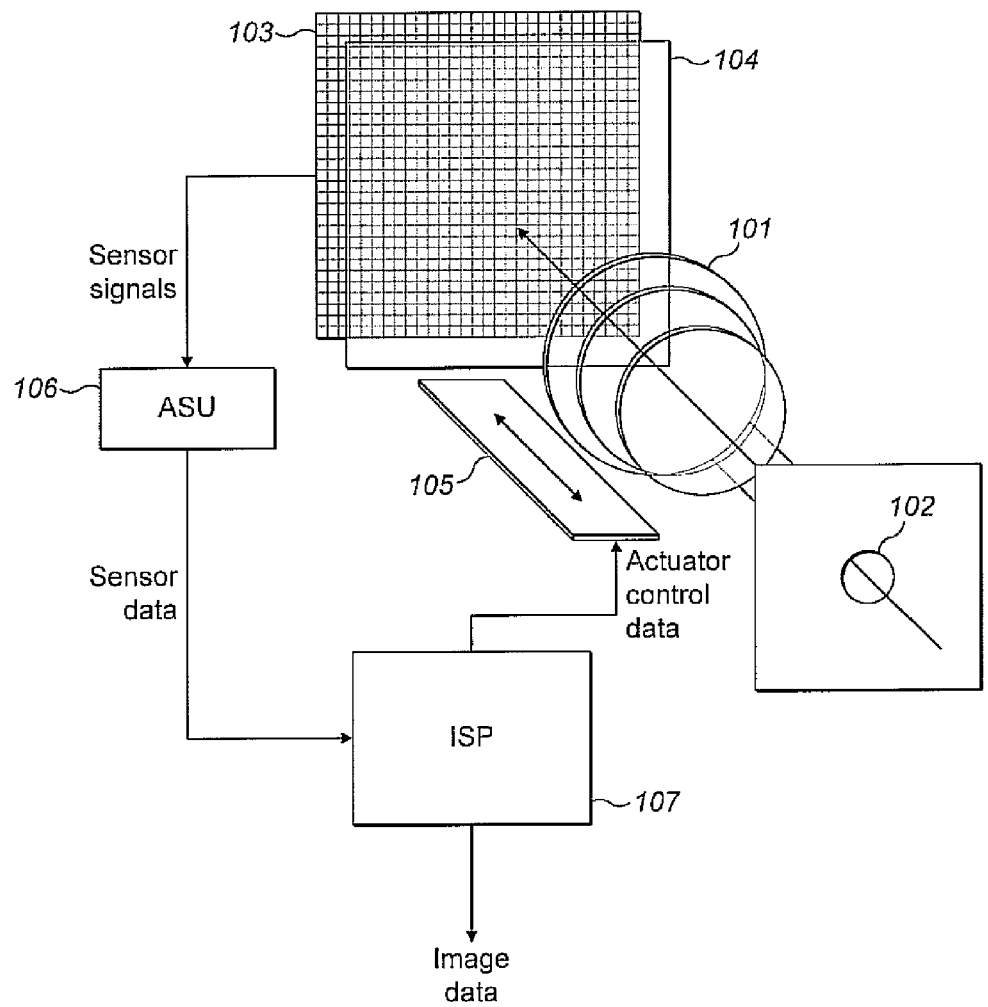
FIG. 1 provides a schematic diagram illustrating selected components of an example of a conventional auto-focusing image capturing module as in the prior art.

FIG. 1 provides a schematic diagram illustrating selected components of an example of a conventional auto-focusing image capturing module. Such a module might typically be included in a device incorporating a camera function such as smart-phone, lap-top computer, tablet computer, compact camera and so on.

The image capturing module shown in FIG. 1 includes a lens stack 101 arranged to focus light entering the system through an aperture 102 onto to a sensor array 103 comprising a plurality of light sensitive elements (pixels). The system optionally includes an infra-red filter 104 positioned between the sensor array 103 and the lens stack to attenuate an infra-red component of the light entering the image capturing module. The lens stack 101 is mounted onto an actuator unit 105 which is arranged to move the lens stack relative to the aperture 102 and the sensor array 103 thereby altering a focal length (i.e. optical power) of the image capturing module.

The sensor array 103 is coupled to an array signal processing unit (ASU) 106 which reads the signals produced by the individual pixels of the sensor array 106 and converts them into a stream of output sensor data. The length of time the pixels are left to collect light before being read by the ASU 103 is referred to as the integration time. In most sensor array implementations, as a pixel is exposed to light it builds charge. When a "signal" from a pixel is "read" by the ASU 106, the amount of charge collected by the pixel during the integration time is measured.

The sensor data stream output from the ASU 106 is input to an image signal processing unit (ISP) 107 which collects the sensor data and performs various processing steps to produce output image data. To capture an image, sensor data is collected from the sensor array over a given period of time to generate a "frame" of data from which an image file (e.g. a JPEG, PNG, Bitmap etc), is eventually produced after the ISP 107 has performed a number of processing steps. Processing steps performed on the image data include, for example white balance correction, color matrix application, lens shading correction and so on. The image data output from the ISP 107 is typically stored in a memory within the device in which the image capturing module is installed.

The ISP 107 is coupled to the actuator unit 105. Actuator control data from the ISP 107 controls actuator unit 105 to move the lens stack 101 in accordance with the auto-focus process described below. It will be understood that moving the lens stack 101 may comprise moving the lens stack in its entirety, moving one or more element of the lens stack or changing the shape of one or more elements of the lens stack to change the optical power of the lens stack. It will be understood that the actuator data may not necessarily be input directly to the actuator unit 105 but may instead be input to actuator driver circuitry (not shown) which converts the actuator control data to suitable control signals for controlling the actuator unit 105.

Auto-focus Process

To enable the position of the lens stack to be set appropriately so that a focused image can be captured, the image capturing module performs an auto-focus process. The auto-focus process is initiated in a number of different circumstances, for example, if the image capturing module is switched on or if a user activates an image capture switch on the camera device.

To perform the auto-focus process, sensor data corresponding to one or more regions of interest (ROIs) is used. A ROI (some times referred to as a "zone") corresponds to an area within the field of view of the image capturing module that does or at least is likely to include objects of which the user is trying to capture an image.

In some examples the number, size and position of ROIs are pre-defined, for example nine ROIs are defined around an area that corresponds to the centre of the field of view of the image capturing module. In other examples the image capturing module may include additional functionality to identify a size and or position of one or more ROIs which are likely to contain an object of interest. For example the ISP 107 may include a face detection function which is arranged to identify parts of a captured image that corresponds to a human face and set the position of one or more ROIs accordingly.

A frame of sensor data is captured at each of a number of focal point positions corresponding to different lens stack positions of the image capturing module ("lens stack position" generally refers to any mechanical modification of the lens stack to alter the optical power of the image capturing module and thus the camera device).

The ISP 107 then derives an overall focus statistic for each of these frames. Rather than using all the sensor data from a frame, the overall focus statistic for a given frame is typically based on a combination and/or selection of individual focus statistics derived from sensor data of each of the ROIs of that frame. As will be understood, the focus statistic of an ROI is a metric indicating the extent to which the captured sensor data within that ROI is in focus (the process of deriving a focus statistic from an individual ROI is explained in more detail below).

Accordingly, the focus statistic for a frame captured at a given focal point position can be based on an average of ROI focus statistics derived for each ROI in a frame of sensor data captured at that focal point position.

In some examples the ROI focus statistics derived by the ISP 107 are averaged to provide an overall focus statistic for a given frame. In some examples if the ROI focus statistic for a particular ROI provides a focus statistic below a threshold value, the ISP 107 disregards that ROI focus statistic when calculating the overall focus statistic for a given frame. In other examples, the ISP 107 can be arranged to always take into account the ROI focus statistics from certain ROIs regardless of any other factor.

Once overall focus statistics for a number of focal point positions have been collected, the focal point position which provides the best focus statistic is then identified and the lens stack 101 is moved to a position corresponding to this focal point position. The auto-focus process is then complete.

Figure 2:
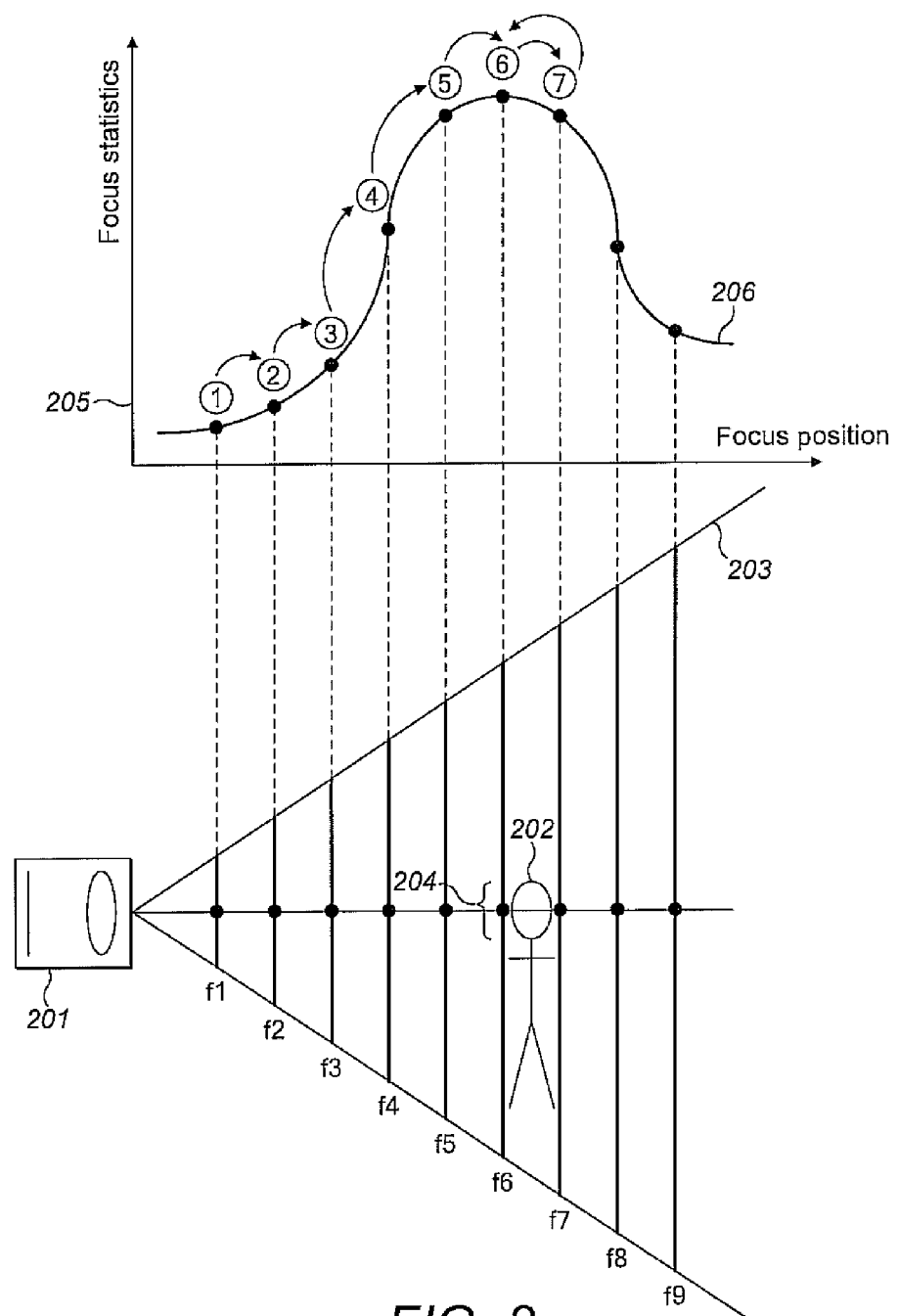
FIG. 2 provides a schematic diagram illustrating an example auto-focusing technique that can be employed in the conventional auto-focusing image capturing module shown in FIG. 1 as in the prior art.

FIG. 2 provides a schematic diagram illustrating an example auto-focusing technique that can be employed in the conventional auto-focusing image capturing module shown in FIG. 1.

A camera device 201 including an auto-focusing image capturing module as shown in FIG. 1 is directed at an object 202 within a field of view 203 of the camera device 201. The auto-focus process is initiated as described above and control data is sent to the actuator unit to move the lens stack such that a focal point of the camera device is moved through a number of focal point positions f1, f2, f3, f4, f5, f5, f6, f7, f8, f9. At each focal point position, sensor data corresponding to a complete frame is processed by the ISP 107. As explained above, the ISP 107 starts by deriving an ROI focus statistic for each ROT of a captured frame. These ROI focus statistics are then combined to give an overall focus statistic for that frame. This process is repeated for each frame.

As explained above, the overall focus statistic derived for a given frame provides an indication of the extent to which the various ROIs within the field of view 203 of the camera device 201 are "in focus" for that frame. As is known in the art, when an optical device is deemed to be "in focus" light rays from a point on an object being viewed through the optical device converge on a single point on a viewing plane of the optical device. In the context of an image capturing module, such as that shown in FIG. 1, the module is deemed to be "in-focus" when a sharply defined (i.e. non-blurry) image from one or more of the ROIs is incident on the sensor array. For example with reference to FIG. 2, if the object 202 is a person and the ROIs correspond to the person's face 204, a well defined and non-blurry image of the face 204 will be reproduced on the sensor array of the camera device 201 when the image capturing module is in focus.

When the focal point position providing the highest focus statistic is identified (i.e. the focal point position from which a frame is captured that gives the best combined ROI focus statistics), actuator control data is sent to the actuator unit which moves the lens stack to a position corresponding to this focal point position.

This concept is illustrated on a first graph 205 shown in FIG. 2. The horizontal axis of the graph 205 represents the focal point position of the camera device 201 and the vertical axis represents the overall focus statistic for a frame of sensor data. The greater the value of the focus statistic, the more "in focus" the camera device 201 is deemed to be for that focal point position. As can be seen from the graph 205, a through focus curve 206, corresponding to the extent to which the camera device 201 is in focus as the focal point increases in distance from the camera device, can be derived from the focus statistics. As can be seen from FIG. 2, the through focus curve 206 reaches a peak at around a sixth focal point position f6.

In the example shown in FIG. 2, the auto-focus process is completed when it has been identified that the sixth focal point position f6 resulted in the highest focus statistic and the lens stack moved accordingly.

Although FIG. 2 shows only nine individual focal point positions, it will be understood that this is for illustrative purposes only. In other examples, many more focal point positions may be used such as 50 or even 500. Also, it will be understood that the spacing between the focal point positions, although shown as equally distributed in FIG. 2, may not be equal. This may generally reflect the fact that there is more resolution towards the "macro" end of the focal range than at the infinity end of the focal range.

Deriving Focus Statistics for Individual Regions of Interest

As explained above, to derive the focus statistics needed for the auto-focus procedure, the auto-focus image capturing module collects sensor data corresponding to a frame for each of the focal point positions f1, f2, f3, f4, f5, f5, f6, f7, f8, f9 and each frame is then analyzed (e.g. tested) to determine the extent to which one or more areas of each frame corresponding to the ROIs are "in-focus". These ROI focus statistics are then combined and an overall focus statistic for each frame is calculated.

A number of techniques can be used to combine the ROI focus statistics into an overall focus statistic for a frame at a given focal point position.

In a simple example, the ROI focus statistics for a given frame are simply averaged to produce the overall focus statistic for that frame. In other examples, the ROI focus statistics for a given frame are each analyzed to determine if they provide a focus statistic above a threshold value. Only ROI focus statistics above the threshold value are averaged to produce the overall focus statistic for the frame. However, in further examples certain ROI focus statistics will be disregarded if they are below the threshold value, but pre-selected ROIs may be identified such that ROI focus statistics from these ROIs are always used, irrespective of whether they produce an ROI focus statistic above or below a threshold value.

A number of processing techniques can be used to derive the ROI focus statistics. These techniques include edge detection and contrast detection techniques which operate on the principle that an image or parts of an image (e.g. ROIs) that are in focus tend to have regions of higher contrast with more sharply defined edges than similar images or parts of images that are not in focus.

Using these techniques, the ISP 107 can attribute a focus "score" (i.e. focus statistic) to each ROI for each frame.

Auto-Focus Optimization Algorithms

The order in which the focal point positions are tested can be arranged in any suitable order. In one example, the image capturing module may move the lens stack so as to simply step through each of a predetermined number of focal point positions in the order of distance from the camera device 201. In other words, a frame is captured for a first focal point position f1, followed by a frame being captured for a second focal point position f2, and so on until a frame is captured for the most extreme focal point position f9 corresponding to the longest focal length. The focal point position providing the highest focus statistic is then identified as the most "in focus" focal position and the lens stack is moved accordingly as described above.

In order to attempt to reduce the time taken to identify the focal point position providing the best focus statistic, other techniques can be used. In some examples, a so-called "hill-climb" algorithm can be employed in which it is assumed that the through focus curve for a given ROI has a defined peak with lower values on either side of the peak. A rough position of the peak is first determined. This rough estimate of the peak position is then further refined by testing the focus statistics of focal point positions to one side of the rough position to identify focal point positions that give improved focus statistics until the peak is past. This is illustrated on the graph 205 shown in FIG. 2 which shows the order in which each focal point position is tested. As can be seen from the example shown on the graph 205 in FIG. 2, the sixth attempt identifies the focus statistic peak at the sixth focal point position f6.

It may be desirable to minimize the time taken for the auto-focus process to complete (sometimes referred to as the auto-focus "convergence time"). If the convergence time is too long, a user may find it difficult to capture a desired image of a changing scene because by the time the camera device is focused the opportunity to take the desired image has passed. Additionally, a user may find that it takes an undesirably long time period for the camera device to re-focus when taking a succession of images.

The time taken for the auto-focus process to complete is dependent on a number of factors, such as the integration time of the image capturing module, the speed with which the ISP operates and so on. However, one of the most significant factors that affects the convergence time is the number of frames that are used to identify the optimum focal point position to focus the camera device.

To reduce the convergence time it would be possible simply to reduce the number of frames/focal point positions tested for the focus statistic. However this is likely to lead to less accurate focusing of the camera device resulting in less focused images being captured. Even though techniques such as the hill-climb algorithm may be able to reduce the number of focal point positions that need to be tested, sensor data for a relatively high number of frames still needs to be captured before the auto-focus process completes.

Rolling Shutter Technique

As explained above, an image is typically generated by an image capturing module by processing a complete frame of sensor data, i.e. data corresponding to the pixels of the whole sensor array.

In some implementations, where the fidelity of the final image is of particular importance, the entire sensor array is integrated over the same period of time. This is sometimes referred to as a "global shutter". Using a global shutter provides a "true" reflection of the scene which is being captured by the image capturing module, but also requires the image capturing module include enough memory to store data for the whole sensor array. In image capturing modules with a large number of pixels in the sensor array this can require a substantial amount of memory. For example, for a five megapixel array, up to 15 MBs of memory would be required. In other implementations where image fidelity can be sacrificed to some extent to reduce cost, a "rolling shutter" technique can be used.

Figure 3:
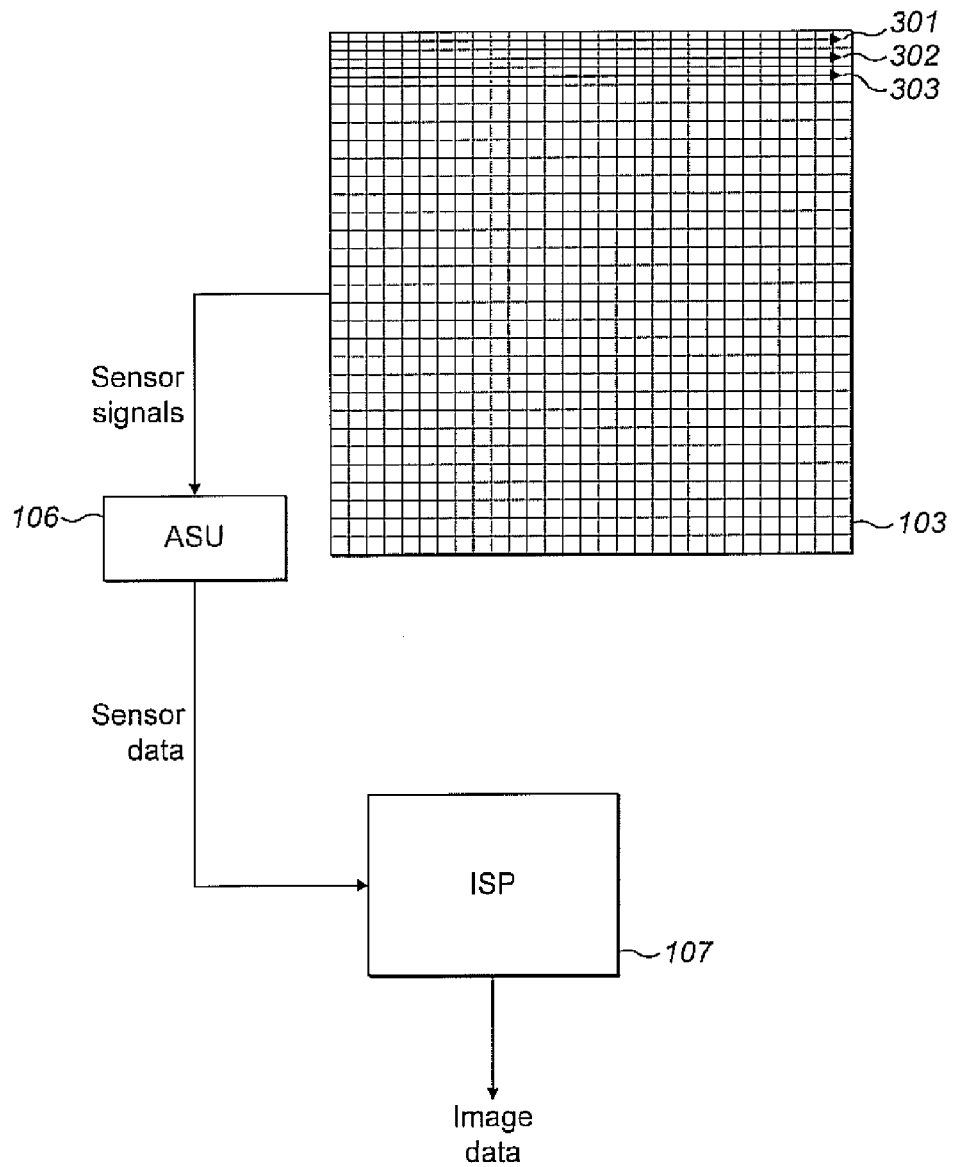
FIG. 3 provides a schematic diagram of an image capturing module corresponding to that shown in FIG. 1 as in the prior art.

FIG. 3 provides a schematic diagram of an image capturing module corresponding to that shown in FIG. 1 except only the sensor array 103, the ASU 106 and the ISP 107 are shown with the other components of the image capturing module shown in FIG. 1 omitted for clarity. In order to reduce the memory requirement of the image capturing module, and in particular the ASU 106, a rolling shutter technique is used to generate a frame from sensor data from the sensor array 103. When capturing a frame using this technique, rather than the ASU 106 simultaneously reading the signal from every pixel of the sensor array, the ASU 106 instead reads from consecutive parts of the array (typically scrolling horizontally from one side of the array to the other). As each pixel, or group of pixels, is read in this fashion, the ASU 106 outputs a stream of sensor data output to the ISP 107.

In the example shown in FIG. 3, signals are read from the pixels of the sensor array 103 from left to right, with a first row of pixels 301 at the top of the sensor array 103 being read first, followed by a second row 302, followed by a third row and so on until sensor data has been collected for the whole sensor array. The sensor data input to the ISP 107 corresponds first to light incident on the first row of pixels 301, then to the second row of pixels 302, then to the third of pixels 303 and so on.

Examples of the present embodiments provide a technique which reduces the time for an image capturing module to auto-focus by taking advantage of phenomena associated with the so-called rolling shutter technique employed in many image capturing modules.

Rolling Shutter Auto-Focus Technique

Figure 4:
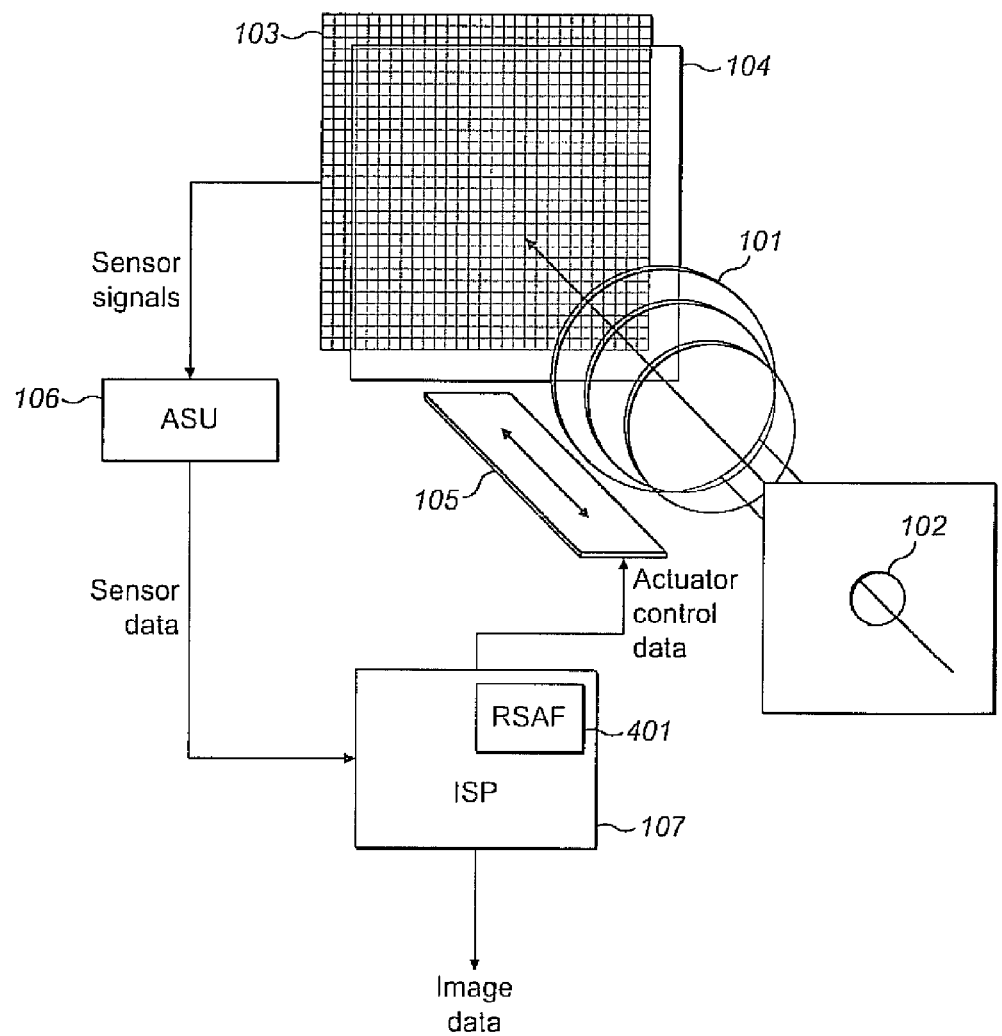
FIG. 4 provides a schematic diagram of an image capturing module arranged in accordance with an example of the present invention.

FIG. 4 provides a schematic diagram of an image capturing module arranged in accordance with an example of the present embodiments.

The components and corresponding functions of the image capturing module shown in FIG. 4 correspond with those shown in FIG. 1 except that the image capturing module of FIG. 4 includes a rolling shutter auto-focus function (RSAF) 401. The RSAF 401 may be implemented within the ISP 107 and replace or enhance the conventional auto-focusing processing elements therein. Alternatively, the RSAF 401 may be implemented as a separate processing unit and positioned or distributed at any suitable position within the image capturing module.

The RSAF 401 is arranged to receive sensor data from the ASU 106 and to generate an estimate of the focal point position providing the best focus statistic in a reduced period of time compared to conventional techniques, thereby reducing the time taken for the auto-focus process to complete. Unless otherwise stated, the RSAF 401 performs the processing described below.

In accordance with examples of the present embodiments, the RASF 401 collects sensor data while the actuator unit 105 is moving the lens stack. This means that, in contrast to conventional techniques, for each frame of data captured during the auto-focus process, there will be sensor data corresponding to more than one focal point position. Accordingly, focus statistics for more than one focal point position can be determined from a single frame. Once all the focus statistics are generated, the optimal focal length can be determined by identifying a focal point position associated with a highest focus statistic as described above.

Figure 5:
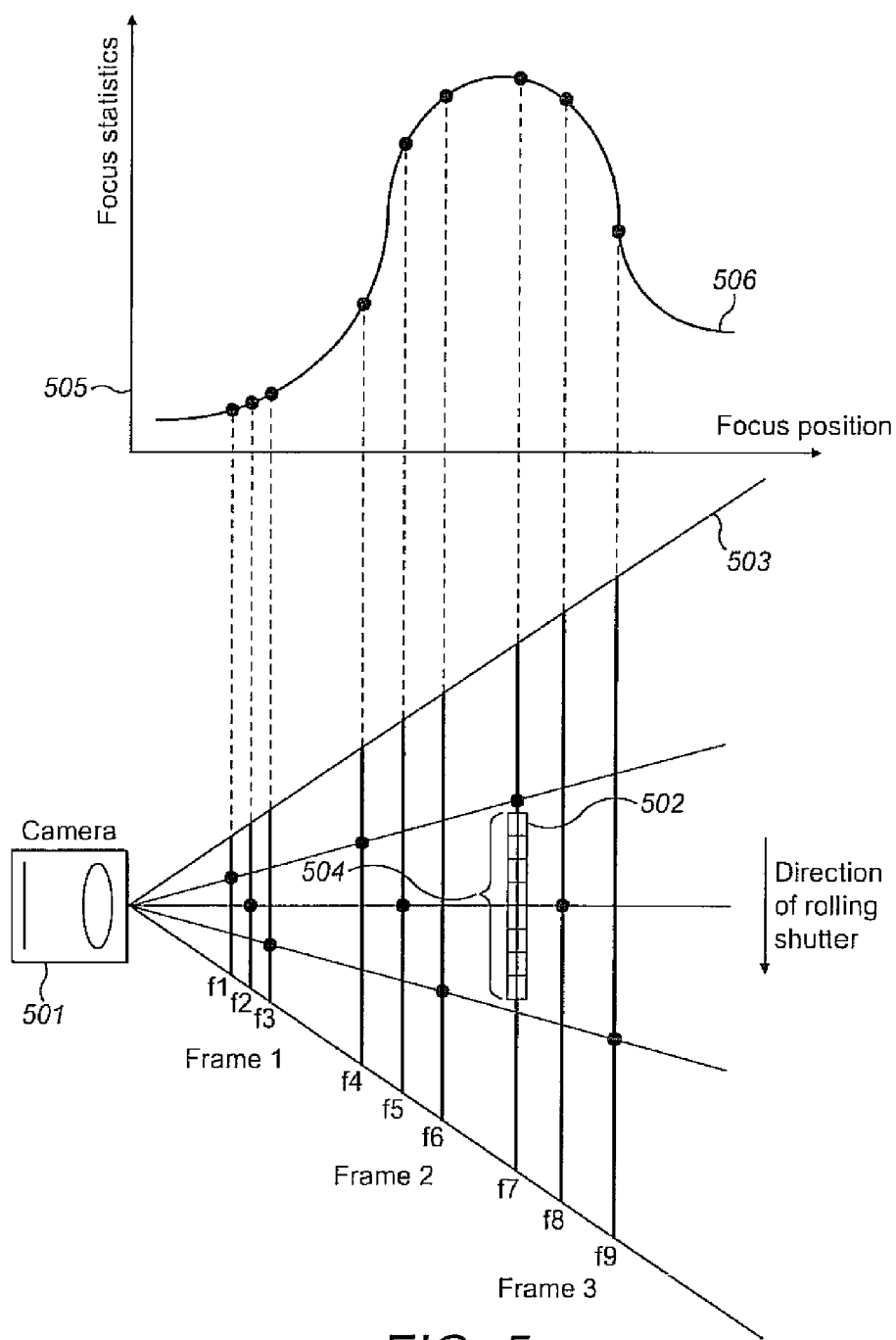
FIG. 5 provides a schematic diagram illustrating an example auto-focusing technique performed in accordance with an example of the present invention.

This concept is shown more clearly in FIG. 5.

FIG. 5 provides a schematic diagram illustrating an example auto-focusing technique performed in accordance with an example of the present embodiments.

FIG. 5 shows a camera device 501 including an image capturing module arranged, in accordance with the auto-focus image capturing module shown in FIG. 4. The camera device 501 is directed at an object 502 within a field of view 503 of the camera device 501.

Once the auto-focus process has been initiated, control data is sent to the actuator unit within the auto-focusing image capturing module of the camera device 501 such that a focal point of the camera device 501 is moved through a number of focal point positions f1, f2, f3, f4, f5, f5, f6, f7, f8, f9. However, unlike the conventional technique shown in FIG. 2 in which the lens stack must be paused at each position long enough for sensor data to be collected for a complete frame, the lens stack is controlled so as to move during the collection of sensor data for a single frame. Thus each frame contains sensor data captured at more than one focal point position.

As can be seen from FIG. 5, a first complete frame (Frame 1) is produced from sensor data taken from a first three focal point positions (f1, f2, f3), a second complete frame (Frame 2) is produced from sensor data taken from a second group of three focal point positions (f4, f5, f6) and a third complete frame (Frame 3) is produced from sensor data taken from a third group of three focal points (f7, f8, f9).

As can be seen from FIG. 5, based on the focus statistics shown in this example the RSAF 401 would identify the focus statistic associated with focal point f7 as providing the optimal focal length and would control the lens stack to move the focal point position accordingly to complete the auto-focus procedure.

As can be seen from the graph 505 shown in FIG. 5, using a rolling shutter auto-focus technique nine focus statistics have been generated from three frames of sensor data. This compares to nine frames required to generate nine focus statistics using the conventional technique shown in FIG. 2. As fewer frames are required to generate the same number of focus statics, the time taken for the auto-focus process to complete is reduced.

It will be understood that although the example shown in FIG. 5 shows the generation of focus statistics based on more than one frame of data (i.e. using a plurality of frames of sensor data), in accordance with some examples of the present technique it is possible to generate focus statistics to identify an optimal focal length from a single frame of data. For example, if only Frame 3 shown in FIG. 5 was captured, focal point f7 would still be identified as providing the optimal focal length and the lens stack could be moved to that focal point position.

As explained with reference to FIG. 3, typically when implementing a rolling shutter technique, signals are collected from the sensor array by sequentially reading from each horizontal line of pixels of the sensor array. Once one line of pixels has been read, the next line of pixels vertically adjacent to the previous line of pixels is read and so on, until signals from each line of pixels in the sensor array have been read. As mentioned above, this means that for a frame captured during the auto-focus process the focal point position will be different for different sections (i.e. different areas in spatial terms) of the frame depending on the vertical position of the sections.

In the example shown in FIG. 5 it is assumed that the lens stack is moved so that the distance from the camera device of the focal point position increases while a frame is captured. Further, the rolling shutter is implemented so that sensor data is captured from top to bottom of the field of view 503. Accordingly, a focus statistic derived for the first focal point position f1 of the first frame (Frame 1) relates to one or more ROIs towards the top of the first frame, a focus statistic derived for the second focal point position f2 relates to one or more ROIs towards the middle of the frame and a focus statistic derived for the third focal point position f3 relates to one or more ROIs towards the bottom of the first frame.

To generate the focus statistic for a particular focal point position, the section of the frame that was captured at that focal point position is identified. ROI focus statistics from ROIs in that section are then used to generate an overall focus statistic for that focal point position. Individual ROI focus statistics are derived (using for example edge detection and contrast detection techniques) as described above.

For example, to derive the focus statistic at the first focal point position f1, an average is taken of individual ROI focus statistics from ROIs towards the top of frame 1. To derive the focus statistic at the second focal point position f2, an average is taken of individual ROI focus statistics from ROIs towards the middle of frame 1. To derive the focus statistic at the third focal point position f3, an average is taken of individual ROI focus statistics from ROIs towards the bottom of frame 1.

It will be understood that any other suitable ROI focus statistic combination technique can be used to generate the overall focus statistic for a given focal point position. For example as mentioned above, in some examples only ROI focus statistics above a threshold value are used to produce the overall focus statistic for a particular focal point position. In further examples, certain ROIs may be pre-selected such that ROI focus statistics that are generated from these ROIs are always used irrespective of their ROI focus statistic score.

However, in the example shown in FIG. 5 it is assumed that the object 502 is a simple object such as a brick wall that presents an effectively uniform surface (e.g. in terms of contrast, brightness, surface texture and so on) such that different focus statistics derived from ROIs corresponding to different parts of the object 502 will be the same or at least closely correspond for the same or closely spaced focal point positions. In other words, a focus statistic derived for the object 502 from an ROI corresponding to the top of the object will be the same or at least closely correspond with a focus statistic derived from an ROI corresponding to the bottom of the object for the same or closely spaced focal point positions. This assumption is valid for scenes containing simple objects, (like a brick wall) that are uniformly colored and textured.

However, as will be understood, some objects will not present a uniform surface. As a result focus statistics that are derived from a number of ROIs corresponding to different parts of a more complex object that are captured at the same or closely spaced focal point positions may be different and not correspond. For example, for a more complex object with a non-uniform surface, a focus statistic derived from an ROI corresponding to the top of the object would not necessarily correspond with a focus statistic derived from an ROI corresponding to the bottom of the object. This can be potentially problematic because focus statistics derived from frames captured at the same or closely spaced focal point positions may vary a great deal. Without performing further analysis it becomes difficult to identify the optimal focal point position using these focus statistics.

In some examples of the invention, scenes containing more complex objects can be accommodated.

Handling Complex Objects with Non-Uniform Surfaces

As explained above, in the example shown in FIG. 5 it is assumed that each of the ROIs from which focus statistics are generated correspond to a simple object (such as a brick wall) from which focus statistics for a given focal point position are the same or at least similar whichever part of the object is being considered. This is a reasonable assumption for simple scenes. However, in more complex scenes it is likely that certain objects will include non-uniform surfaces. This concept is illustrated in FIG. 6.

Figure 6:
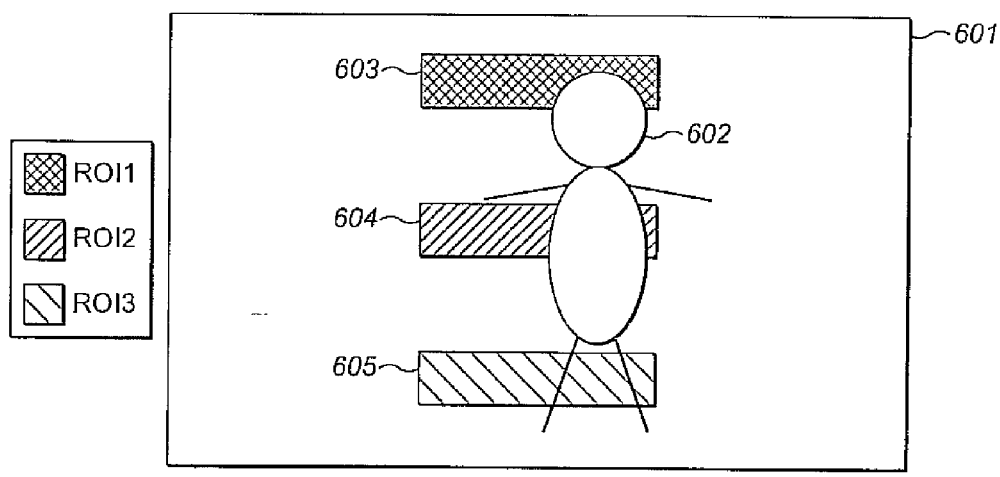
FIG. 6 shows a scene within a field of view of a camera device including an object.

FIG. 6 shows a scene within a field of view 601 of a camera device including a close up of an object 602, such as a person. In the example shown in FIG. 6, the object 602 may be quite close to the camera device allowing a lot of visual detail to be resolved and thereby resulting in differences in color, brightness and surface texture of the object becoming visually significant. In the example shown in FIG. 6, a first ROI 603 may correspond to a person's forehead which is smooth, bright with low contrast, a second ROI 604 may correspond to the person's jacket which has an irregular, non-smooth surface of varying contrast and low brightness and a third ROI 605 corresponds to the person's shoes which are smooth, of low contrast and low brightness.

As will be understood, due to the variation in the surfaces of these parts of the person, focus statistics derived from the corresponding ROIs will be different despite the fact that the person's forehead, jacket and feet are all at approximately same distance from the camera device.

Accordingly, when generating the overall focus statistic given focal point position for more complex scenes such as that shown in FIG. 6 it is preferable to take account of the fact that data from different ROIs may relate to objects or parts of objects that despite being about the same distance from the camera device produce different focus statistics.

Figure 7:
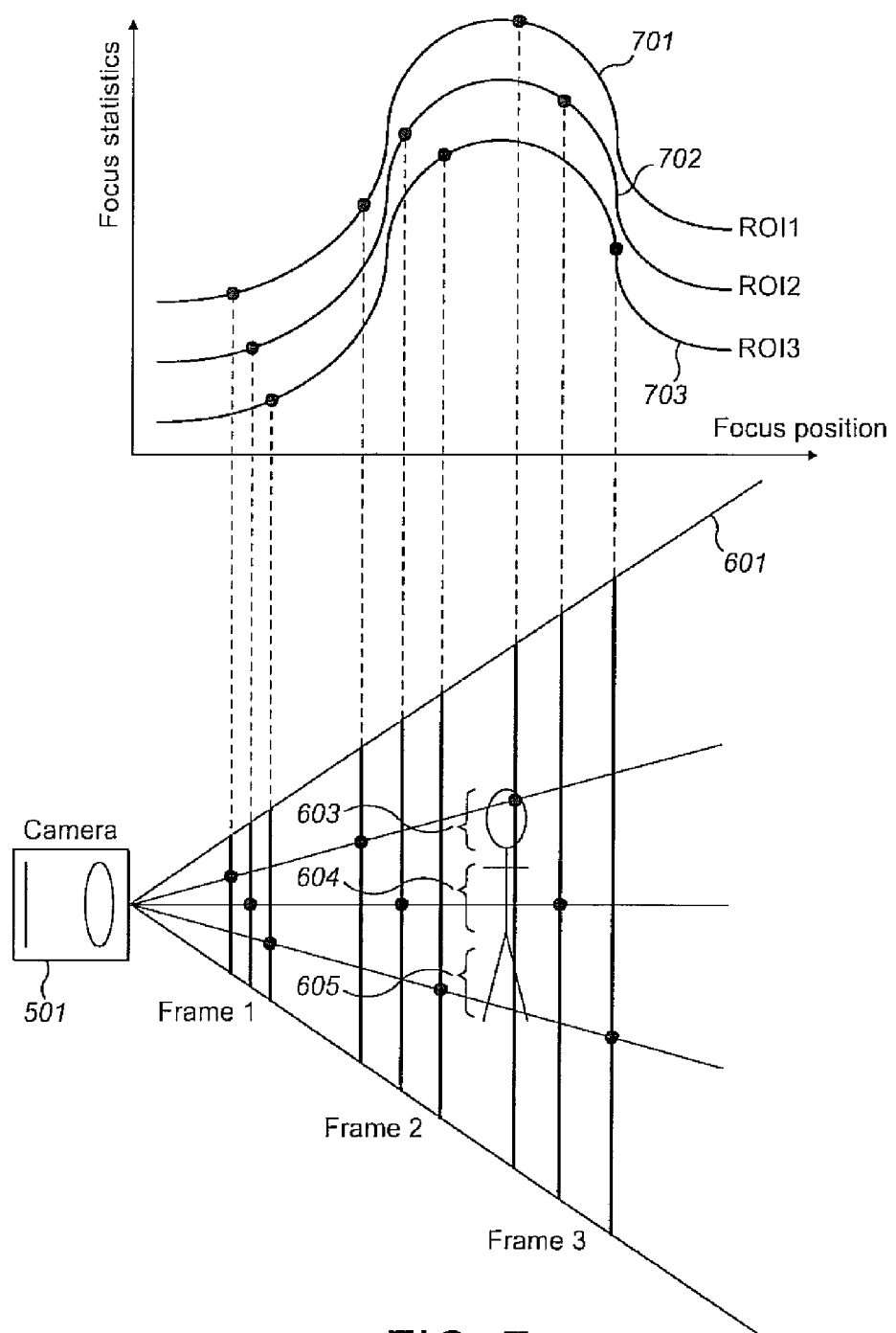
FIG. 7 provides a schematic diagram illustrating an example auto-focusing technique performed in accordance with an example of the present invention in which the field of view of the camera device includes multiple regions of interests corresponding to different objects or parts of an object.

FIG. 7 provides a schematic diagram illustrating an example auto-focusing technique performed in accordance with an example of the present invention in which the field of view of the camera device 601 includes multiple ROIs as shown in FIG. 6 which each correspond to a part of an object with a non-uniform surface.

Accordingly, as can be seen from FIG. 7, despite the fact that each part of the object to which each of the three ROIs 603, 604, 605 corresponds are at about the same distance from the camera device, each ROI generates a different through focus curve 701, 702, 703. This contrasts with FIG. 5 in which it is assumed that each part of the object to which each ROT corresponds provides the same or closely similar focus statistic for a given focal point position therefore a single through focus curve can be used. In order to accommodate objects with non-uniform surfaces, the RSAF is arranged to identify each separate through focus curve.

In order to separately identify each through focus curve shown in FIG. 7 the RSAF identifies which of the frame sections relate to which ROI. In order to do this the RSAF typically takes into account the time at which the lens stack starts moving, the point in time at which sensor data corresponding to each individual ROI is being read from the sensor array, and the position of the lens at any given time.

In some examples, for example if the actuator unit can move relatively quickly, (and specifically can move the lens stack to a new position in less time than in takes for sensor data to be received from areas of the sensor array corresponding to different ROIs) then the lens stack can change focal point positions (and optionally pause) between ROIs. If on the other hand the lens actuator is slow and cannot move the lens stack to a new position in less time than in takes for sensor data to be received from areas of the sensor array corresponding to different ROIs, two or more ROIs can be integrated over one or more frames.

When the auto-focus process is conducted for a complex scene such as that shown in FIG. 6, a number of methods can be performed by the RSAF to determine the optimal focal point position to complete the auto-focus process. These methods can be based on the through focus curve associated with a selected ROI or a combination of data from the through focus curves of all the ROIs.

The methods performed by the RSAF to determine the optimal focal point position can include one or more of the following.

In some examples the through focus curve of the ROI with the highest focus statistics is chosen by the RSAF. The highest focus statistic is then chosen from this through focus curve. More specifically, the focus statistics associated with each ROI are used to form a plurality of focus data sets. With reference to FIG. 7 for example, the focus statistics associated with the through focus curve 701 of the first ROI form a first data set, the focus statistics associated with the through focus curve 702 of the second ROI form a second data set and the focus statistics associated with the through focus curve 703 of the third ROI form a third data set. For each data set, an average value of the focus statistics in that data set is determined by the RSAF. The data set with the highest average value is then identified and the highest focus statistic from that data set is used by the RSAF to determine the optimal focal point position for the auto-focus procedure.

In other examples the through focus curves are "normalized" by the RSAF with respect to each other by, for example, multiplying the lower curves by a suitable factor. The highest focus statistic from the normalized curves is then used. More specifically, as set out above, the focus statistics associated with each ROI are used to form a plurality of focus data sets. The data sets are then normalized with respect to each other and the focus statistic from all of the normalized focus data sets with a highest value is used to determine the optimal focal point position for the auto-focus procedure.

In another example, the through focus curves are weighted by importance by the RSAF, with the highest focus statistics resulting in a higher weighting (i.e. importance). For example, a through focus curve comprising very low focus statistics could be given a low importance. On the other hand, a through focus curve comprising very high focus statistics might be given a high importance. A through focus curve providing intermediate focus statistics might be given an intermediate importance. This concept is illustrated further with reference to FIG. 8.

Figure 8:
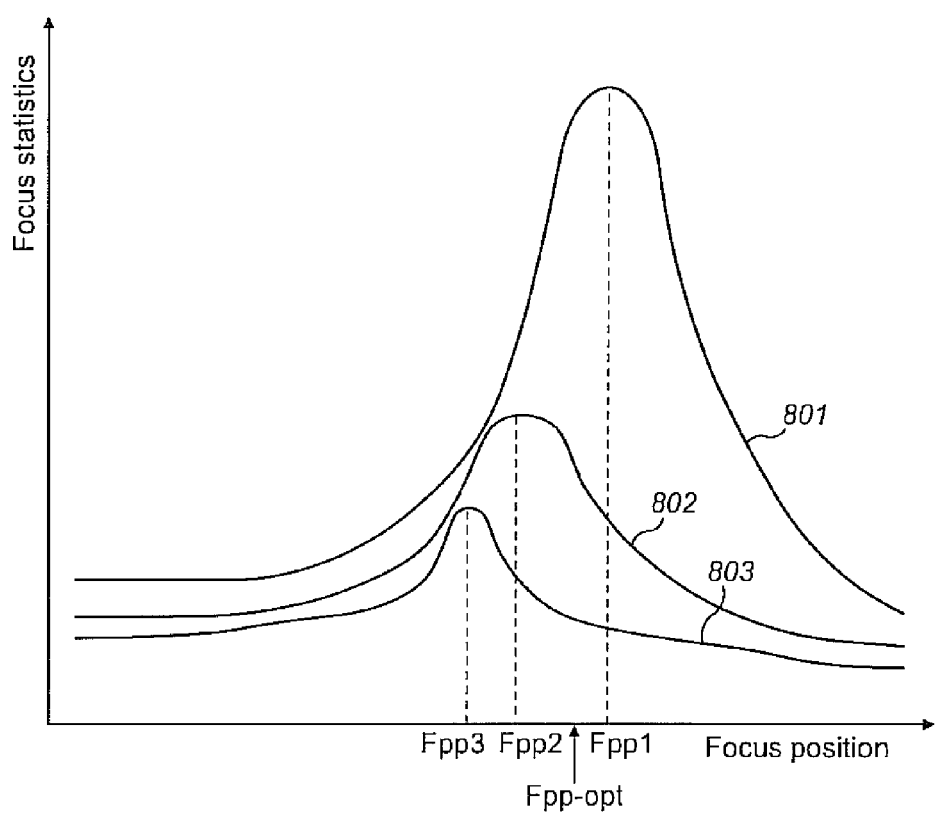
FIG. 8 shows a group of through focus curves derived from a series of frames captured in accordance with the an example of the present invention, and FIG. 9 provides a schematic diagram showing a method performed in accordance with an example of the present invention.

FIG. 8 shows a first through focus curve 801, second through focus curve 802 and third through focus curve 803 derived from three different ROIs of a series of frames captured in accordance with an example of the present embodiments. As in FIG. 7, in FIG. 8 each through focus curve corresponds to a different part of an object with a non-uniform surface.

As can be seen from FIG. 8, the first through focus curve 801 suggests an optimal focal point position at focal point position Fpp1, the second through focus curve 802 suggests an optimal focal point position at a second focal point position Fpp2, and the third through focus curve 803 suggests an optimal focal point position at a third focal point position Fpp3. Further, the first through focus curve 801 comprises the highest focus statistic values and is therefore identified as being of high importance. The third through focus curve comprises the lowest focus statistics and is therefore identified as being of lower importance. The second through focus curve comprises focus statistics between those of the first through focus curve 801 and the third through focus curve 803 and is therefore identified as being of intermediate importance.

The optimal focal point positions Fpp1, Fpp2, Fpp3 associated with each through focus curve are attributed a weighting associated with their identified importance. Accordingly, Fpp1 is given a high weighting, Fpp2 is given an intermediate weighting and Fpp3 is given a low weighting. The overall optimal focus point position Fpp-opt is then determined by the RSAF by calculating an average focal point position of the three weighted focal point positions. In the example shown in FIG. B, this results in an optimal focal point position Fpp-opt which is closest to the optimal focal point position Fpp1 suggested by the most important (and thus most highly weighted) through focus curve but "pulled" towards the optical focal point positions Fpp2, Fpp3 suggested by the two other, less highly weighted through focus curves 802, 803.

In another more simple example the peaks of the through focus curve for each ROI are identified by the RSAF and the position of an average peak determined. The RSAF then uses the position of this average peak to identify the optimal focal point position.

Figure 9:
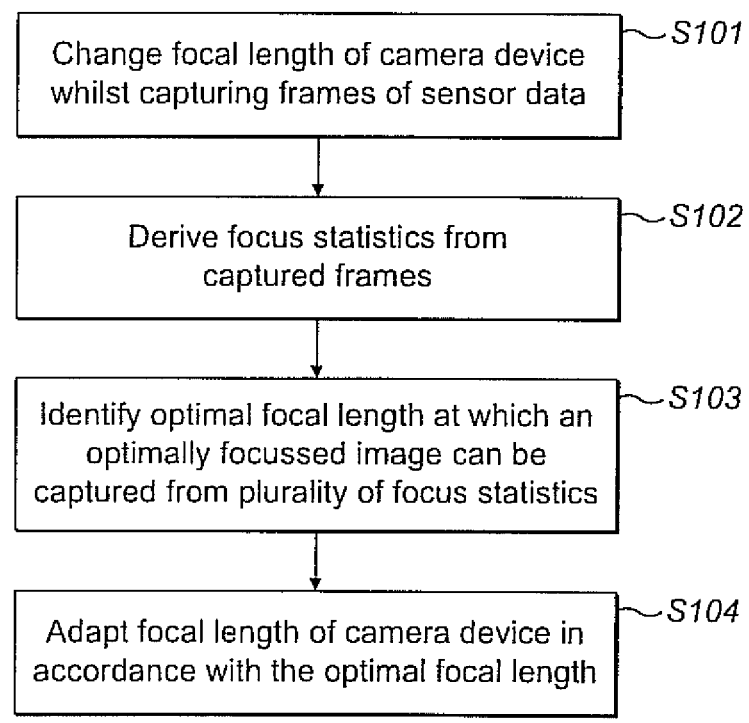

FIG. 9 provides a flow diagram showing a method performed in accordance with an example of the present embodiments. Step S101 comprises changing a focal length of a camera device while capturing one or more frames of sensor data from a sensor array of the camera device by sequentially reading signals from different areas of the sensor array such that different sections of each frame correspond to sensor data captured at different focal lengths of the camera device. Step S102 comprises deriving from the one or more captured frames a plurality of focus statistics, each focus statistic providing a measure of an extent to which a section of a frame to which the focus statistic relates is in focus at a given focal length. Step S103 comprises identifying from the plurality of focus statistics an optimal focal length at which an optimally focused image can be captured.

Step S104 comprises adapting the focal length of the camera device in accordance with the optimal focal length.

It will be appreciated that the specific embodiments described above are described by way of example only and other embodiments and variations are can be envisaged without departing from the spirit or scope of the invention.

For example, although the specific embodiments set out above have been described mainly in terms of capturing frames of sensor data relating to frames of still images, it will be appreciated that the present embodiments are equally applicable for other optical imaging applications such as video capture.

Furthermore, it will be understood that the particular component parts of which the camera device and auto-focusing image capturing module described above are comprised, for example the ASU, ISP and RSAF in some examples, by logical designations. Accordingly, the functionality that these component parts provide may be manifested in ways that do not conform precisely to the forms described above and shown in the diagrams. For example, aspects of the embodiments may be implemented in a non-transitory form of a computer program product comprising instructions (i.e. a computer program) that may be implemented on a processor, stored on a data sub-carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realized in hardware as an ASIC (application specific integrated circuit) or an FPGA (field programmable gate array) or other configurable or circuit suitable to use in adapting the conventional equivalent device.

That which is claimed is:

1. A method of performing auto-focusing comprising:
changing a focal length of a camera device while capturing each frame of sensor data from a sensor array of the camera device by sequentially reading signals from different rows of the sensor array such that each frame of sensor data includes different frame sections corresponding to sensor data captured from the different rows at different focal lengths of the camera device;
deriving a plurality of focus statistics from at least one frame of sensor data, each focus statistic providing a measure of an extent to which a corresponding frame section is in focus at a given focal length, the deriving comprising
deriving each focus statistic from a plurality of regions of interest from corresponding frame sections in a respective frame, and
generating a plurality of focus data sets, each focus data set comprising the focus statistics relating to one of the plurality of regions of interest providing a through focus curve relating to that region of interest;
identifying based upon a plurality of peaks in the focus curves from the plurality of focus statistics an optimal focal length at which an optimally focused image can be captured; and
adapting the focal length of the camera device in accordance with the optimal focal length.

2. The method according to claim 1, wherein identifying the optimal focal length comprises identifying from the plurality of focus statistics an optimal focus statistic, the optimal focal statistic indicating that a corresponding frame section is most in focus compared to other frame sections, and identifying a focal length associated with the optimal focus statistic as the optimal focal length.

3. The method according to claim 2, wherein identifying the optimal focus statistic comprises identifying which of the plurality of focus statistics has a highest value.

4. The method according to claim 1, wherein the camera device captures a plurality of frames of sensor data.

5. The method according to claim 4, wherein each of said through focus curves indicates an extent to which the corresponding region of interest is in focus as the focal length of the camera device changes.

6. The method according to claim 5, wherein identifying the optimal focal length comprises:
determining an average value for the focus statistics in each focus data set;
identifying which data set has the highest average focus statistic value; and
identifying the optimal focal length from a focal length associated with a highest value focus statistic from the focus data set determined to have the highest average focus statistic value.

7. The method according to claim 5, wherein identifying the optimal focal length comprises:
normalizing the plurality of focus data sets with respect to each other; and
identifying the optimal focal length from a focal length associated with a focus statistic from the normalized focus data sets with a highest normalized value.

8. The method according to claim 5 wherein identifying the optimal focal length comprises:
identifying the plurality of peaks from each of the through focus curves;
determining a plurality of focal lengths, each focal point length corresponding to one of the plurality of peaks;
determining an average focal length from the plurality of focal lengths corresponding to the plurality of peaks; and
identifying the optimal focal length as corresponding to the determined average focal length.

9. A method of auto-focusing comprising:
changing a focal length of a camera device while capturing each frame of sensor data from a sensor array by reading signals from different rows of the sensor array such that each frame of sensor data includes different frame sections corresponding to sensor data captured from the different rows at different focal lengths;
deriving a plurality of focus statistics from at least one frame of sensor data, the deriving comprising
deriving each focus statistic from a plurality of regions of interest from corresponding frame sections in a respective frame, and
generating a plurality of focus data sets, each focus data set comprising the focus statistics relating to one of the plurality of regions of interest providing a through focus curve relating to that region of interest;
identifying based upon a plurality of peaks in the focus curves from the plurality of focus statistics a desired focal length; and
adapting the focal length of the camera device in accordance with the desired focal length.

10. The method according to claim 9, wherein identifying the desired focal length comprises identifying from the plurality of focus statistics an optimal focus statistic, the optimal focal statistic indicating that a corresponding frame section is most in focus compared to other frame sections, and identifying a focal length associated with the optimal focus statistic as the desired focal length.

11. The method according to claim 10, wherein identifying the optimal focus statistic comprises identifying which of the plurality of focus statistics has a highest value.

12. The method according to claim 9, wherein the camera device captures a plurality of frames of sensor data.

13. An auto-focus system for a camera device comprising a sensor array, and a lens stack arranged to direct light onto the sensor array, the auto-focus system comprising:
a processor arranged to
control the lens stack to change a focal length of the camera device while each frame of sensor data is captured from the sensor array by sequentially reading signals from different rows of the sensor array such that each frame of sensor data includes different frame sections corresponding to sensor data captured from the different rows at different focal lengths,
derive a plurality of focus statistics from at least one frame of sensor data, each focus statistic providing a measure of an extent to which a corresponding frame section is in focus at a given focal length, the deriving comprising
deriving each focus statistic from a plurality of regions of interest from corresponding frame sections in a respective frame, and
generating a plurality of focus data sets, each focus data set comprising the focus statistics relating to one of the plurality of regions of interest providing a through focus curve relating to that region of interest,
identify based upon a plurality of peaks in the focus curves from the plurality of focus statistics an optimal focal length, and
control the lens stack in accordance with the optimal focal length thereby focusing the camera device.

14. The auto-focusing system according to claim 13, wherein said processor is arranged to identify the optimal focal length by identifying from the plurality of focus statistics an optimal focus statistic, the optimal focal statistic indicating that a corresponding frame section is most in focus compared to other frame sections and identify a focal length associated with the optimal focal statistic as the optimal focal length.

15. The auto-focusing system according to claim 14, wherein said processor is arranged to identify the optimal focus statistic by identifying which of the plurality of focus statistics has a highest value.

16. The auto-focusing system according to claim 13, wherein each of said through focus curves indicates an extent to which the corresponding region of interest is in focus as the focal length changes.

17. The auto-focusing system according to claim 13, wherein said processor is arranged to identify the optimal focal length by at least:
determining an average value for the focus statistics in each focus data set;
identifying which data set has the highest average focus statistic value; and
identifying the optimal focal length from a focal length associated with a highest value focus statistic from the focus data set determined to have the highest average focus statistic value.

18. The auto-focusing system according to claim 13, wherein said processor is arranged to identify the optimal focal length by at least:
normalizing the plurality of focus data sets with respect to each other; and
identifying the optimal focal length from a focal length associated with a focus statistic from the normalized focus data sets with a highest value.

19. The auto-focusing system according to claim 13 wherein said processor is arranged to identify the optimal focal length by at least:
identifying the plurality of peaks from each of the through focus curves;
determining a plurality of focal lengths, each focal point length corresponding to one of the plurality of peaks;
determining an average focal length from the plurality of focal lengths corresponding to the plurality of peaks; and
identifying the optimal focal length as corresponding to the determined average focal length.

20. An auto-focus system for a camera device comprising a sensor array, and at least one lens arranged to direct light onto the sensor array, the auto-focus system comprising:
a processor arranged to
control the at least one lens to change a focal length while each frame of sensor data is captured from the sensor array by reading signals from different rows of the sensor array such that each frame of sensor data includes different frame sections corresponding to sensor data captured from the different rows at different focal lengths,
derive a plurality of focus statistics from at least one frame of sensor data, the deriving comprising
deriving each focus statistic from a plurality of regions of interest from corresponding frame sections in a respective frame, and
generating a plurality of focus data sets, each focus data set comprising the focus statistics relating to one of the plurality of regions of interest providing a through focus curve relating to that region of interest,
identify based upon a plurality of peaks in the focus curves from the plurality of focus statistics a desired focal length, and control the at least one lens in accordance with the desired focal length.

21. The auto-focusing system according to claim 20, wherein said processor is arranged to identify the desired focal length by identifying from the plurality of focus statistics an optimal focus statistic, the optimal focal statistic indicating that a corresponding frame section is most in focus compared to other frame sections and identify a focal length associated with the optimal focus statistic as the desired focal length.

22. The auto-focusing system according to claim 21, wherein said processor is arranged to identify the optimal focus statistic by identifying which of the plurality of focus statistics has a highest value.

23. A camera device comprising
a sensor array;
at least one lens arranged to direct light onto the sensor array; and
a processor arranged to
control the at least one lens to change a focal length while each frame of sensor data is captured from the sensor array by reading signals from different rows of the sensor array such that each frame of sensor data includes different frame sections corresponding to sensor data captured from the different rows at different focal lengths,
derive a plurality of focus statistics from at least one frame of sensor data, the deriving comprising
deriving each focus statistic from a plurality of regions of interest from corresponding frame sections in a respective frame, and
generating a plurality of focus data sets, each focus data set comprising the focus statistics relating to one of the plurality of regions of interest providing a through focus curve relating to that region of interest,
identify based upon a plurality of peaks in the focus curves from the plurality of focus statistics a desired focal length, and
control the lens at least one lens in accordance with the desired focal length.

24. The camera device according to claim 23, wherein said processor is arranged to identify the desired focal length by identifying from the plurality of focus statistics an optimal focus statistic, the optimal focal statistic indicating that a corresponding frame section is most in focus compared to other frame sections and identify a focal length associated with the optimal focus statistic as the desired focal length.

25. The camera device according to claim 24, wherein said processor is arranged to identify the optimal focus statistic by identifying which of the plurality of focus statistics has a highest value.

26. A non-transitory computer readable medium comprising instructions which when implemented on a processor coupled to at least one lens arranged to direct light onto a sensor array, performs steps comprising:
controlling the at least one lens to change a focal length while each frame of sensor data is captured from the sensor array by reading signals from different rows of the sensor array such that each frame of sensor data includes different frame sections corresponding to sensor data captured from the different rows at different focal lengths, the deriving comprising
deriving each focus statistic from a plurality of regions of interest from corresponding frame sections in a respective frame, and
generating a plurality of focus data sets, each focus data set comprising the focus statistics relating to one of the plurality of regions of interest providing a through focus curve relating to that region of interest;
deriving a plurality of focus statistics from at least one frame of sensor data;
identifying based upon a plurality of peaks in the focus curves from the plurality of focus statistics a desired focal length; and
controlling the at least one lens in accordance with the desired focal length.

* * * * *